US011290006B2

(12) United States Patent
Ozanoglu et al.

(10) Patent No.: US 11,290,006 B2
(45) Date of Patent: Mar. 29, 2022

(54) SIDO BUCK WITH NEGATIVE CURRENT

(71) Applicant: Dialog Semiconductor (UK) Limited, London (GB)

(72) Inventors: Kemal Ozanoglu, Istanbul (TR); Pier Cavallini, Swindon (GB); Burak Dundar, Istanbul (TR)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/687,229

(22) Filed: Nov. 18, 2019

(65) Prior Publication Data

US 2021/0152082 A1 May 20, 2021

(51) Int. Cl.
*H02M 3/00* (2006.01)
*H02M 3/04* (2006.01)
*H02M 1/00* (2006.01)

(52) U.S. Cl.
CPC ............... *H02M 3/04* (2013.01); *H02M 1/00* (2013.01); *H02M 1/009* (2021.05)

(58) Field of Classification Search
CPC ........ H02M 1/12; H02M 1/14; H02M 7/5387; H02M 2007/4835; H02M 3/1582; H02M 3/1584; H02M 3/285; H02M 3/33561
See application file for complete search history.

(56) References Cited

U.S. PATENT DOCUMENTS

| 6,222,351 | B1 | 4/2001 | Fontanella et al. |
| 7,061,214 | B2 | 6/2006 | Mayega et al. |
| 7,119,612 | B1 * | 10/2006 | Holloway ................. H03F 1/02 330/9 |
| 7,276,886 | B2 | 10/2007 | Kinder et al. |
| 8,502,515 | B1 * | 8/2013 | Wan .................... H02M 3/1584 323/282 |
| 9,768,676 | B1 * | 9/2017 | Shen ..................... H02M 3/156 |
| 10,014,778 | B1 * | 7/2018 | Wei ...................... H02M 3/155 |
| 2005/0264271 | A1 | 12/2005 | Lam et al. |
| 2010/0002473 | A1 * | 1/2010 | Williams ............ H02M 3/1584 363/21.06 |

(Continued)

OTHER PUBLICATIONS

German Office Action, File No. 10 2020 200 873.6, Applicant: Dialog Semiconductor (UK) Limited, dated Jul. 3, 2020, 8 pages.

(Continued)

*Primary Examiner* — Adolf D Berhane
*Assistant Examiner* — Afework S Demisse
(74) *Attorney, Agent, or Firm* — Saile Ackerman LLC; Stephen B. Ackerman

(57) ABSTRACT

It is an object of one or more embodiments of the present disclosure to provide a single-inductor dual-output (SIDO), or single-inductor multiple-output (SIMO), Buck switching converter which can supply opposite polarity current to its outputs, through an inductor. It is a further object of one or more embodiments, when one output has an overshoot and the other output is below a reference, to enable discharging the overshoot output to the other output, resulting in a significant charge recycling and considerable increase in power efficiency. Still further, it is an object of one or more embodiments to improve output voltage ripple, as both outputs are being supplied at the same time, compared to prior art SIDO operation, where only one output is supplied for a given phase.

15 Claims, 8 Drawing Sheets

(56) References Cited

U.S. PATENT DOCUMENTS

2010/0039080 A1* 2/2010 Schoenbauer ...... H02M 3/1582
323/234
2016/0181906 A1* 6/2016 Gambetta ............... H02M 1/08
323/288

OTHER PUBLICATIONS

"Single-Inductor-Multiple-Output Switching DC-DC Converters," by Dongwon Kwon et al., IEEE Transactions on Circuits and Systems—II: Express Briefs, vol. 56, No. 8, Aug. 2009, pp. 614-618.

* cited by examiner

900

910
In a discontinuous conduction mode (DCM), providing a positive current at a first output in a first DCM phase, and discharging a negative current at a second output through a discharge switch provided at an inductor output node in a second DCM phase

920
In a continuous conduction mode (CCM), providing a positive current at the first output in a first CCM phase, and in a second CCM phase connecting a negative current from the second output to the first output

FIG. 9

SIDO BUCK WITH NEGATIVE CURRENT

BACKGROUND

Field

The present disclosure relates generally to DC-DC switching converters with single inductor and multiple outputs. More particularly, the present invention relates to single-inductor dual-output (SIDO) and single-inductor multiple-output (SIMO) Buck switching converters, with the option to provide complementary (negative and positive) output currents at the same time.

Background

A topology limitation in conventional SIDO/SIMO Buck converters is that it can only supply output currents with the same polarity to all outputs. For example, in continuous-conduction mode (CCM), when one output is requesting positive current, it is not possible to perform negative dynamic voltage control (DVC), or reduce an overshoot at the other output(s).

A conventional solution to this problem (supplying positive output current to one output while discharging the other output) is to use a pull-down switch for discharging. When an overshoot event occurs, or a negative DVC event is requested, the pull-down switch discharges the output capacitor to the requested voltage level. The major drawback of this solution is efficiency loss. In inductive switching converters, it is preferred to preserve charge by continued usage of the inductor.

Buck converters with a single inductor having multiple outputs are preferred in applications where the total load current can be supported by a single inductor, and when it is preferred to save PCB area and cost by avoiding additional external components.

FIG. 1 shows 100, a single-inductor dual-output (SIDO) Buck switching converter, of the prior art. A topology limitation in conventional SIDO/SIMO Buck converters is that, it can only supply output currents with the same polarity to all outputs. As an example, in FIG. 1, the inductor LO current iL is flowing to the outputs VON and VO1. However, if an overshoot happens in one of the outputs, or a negative DVC is requested for one of the outputs, then the Buck converter will not be able to reduce that output voltage, because inductor current is in the positive direction.

SUMMARY

Accordingly, it is an object of one or more embodiments of the present disclosure to provide a single-inductor dual-output (SIDO), or single-inductor multiple-output (SIMO), Buck switching converter which can supply opposite polarity current to its outputs, through a single inductor.

It is a further object of one or more embodiments of the disclosure, when one output has an overshoot and the other output is below a reference, to enable discharging the overshoot output to the other output, resulting in significant charge recycling and considerable increase in power efficiency.

Still further, it is an object of one or more embodiments of the disclosure to improve output voltage ripple, as both outputs are being supplied at the same time, compared to prior art SIDO operation, where only one output is supplied for a given phase.

Other objects will appear hereinafter.

The above and other objects of the present disclosure may be accomplished in the following manner. A single-inductor dual- or multiple-output (SIDO/SIMO) switching converter with negative current, comprising an inductor input node at an output of the switching converter, an inductor connected between the inductor input node and an inductor output node, a positive output switch connected between the inductor input node and a first output configured to provide a positive current, a negative output switch connected between the inductor input node and a second output configured to provide a negative current, and a discharge switch connected between the inductor output node and a lower voltage reference is disclosed.

The above and other objects of the present disclosure may be further accomplished with a method for a single-inductor dual-output (SIDO) switching converter with negative current. The steps include, in a discontinuous-conduction mode (DCM), providing a positive current at a first output in a first DCM phase, and discharging a negative current at a second output through a discharge switch provided at an inductor output node in a second DCM phase. The steps also include, in a continuous-conduction mode (CCM), providing a positive current at the first output in a first CCM phase, and in a second CCM phase connecting a negative current from the second output to the first output.

In various embodiments the function may be used for other topologies such as a SIMO Boost, SIMO Buck/Boost and inverting SIMO Buck/Boost switching converter.

BRIEF DESCRIPTION OF THE DRAWINGS

The present disclosure will be more clearly understood from the following description taken in conjunction with the accompanying drawings in which like reference numerals designate similar or corresponding elements, regions and portions and in which:

FIG. 9 is a flow chart of a method for a single-inductor dual- or multiple-output (SIDO/SIMO) switching converter with negative current.

DETAILED DESCRIPTION

Figure 1:
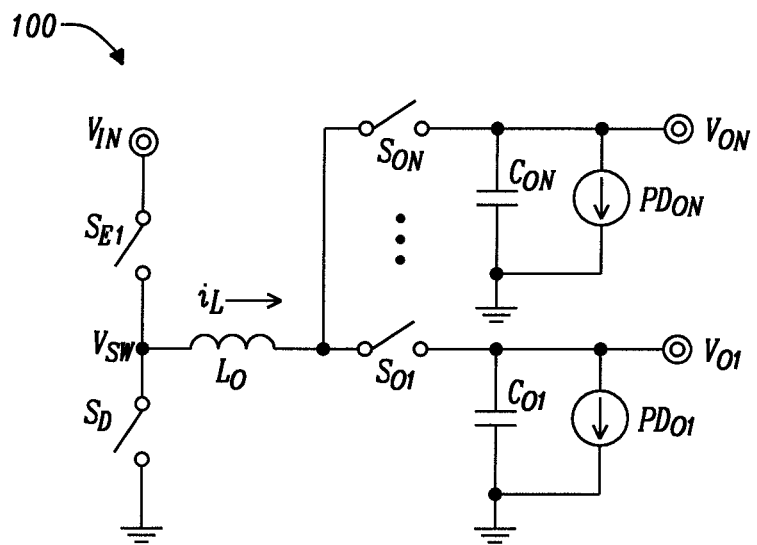
FIG. 1 shows a single-inductor dual-output (SIDO) Buck switching converter, of the prior art.

The present disclosure proposes a SIDO/SIMO Buck converter having a negative current and DVC function, with the flexibility to supply opposite polarity current to its outputs. The present invention aims to solve prior art limitations with additional switches, to supply a negative current to one of the outputs while supplying positive current to the other output(s).

Throughout this application, the terms SIDO, SIMO, and SIDO/SIMO are used interchangeably, and meant to refer to single-input switching converters with two or more outputs. In the drawings, examples showing two outputs could readily be extended to three or more outputs, using the disclosed techniques.

Figure 2:
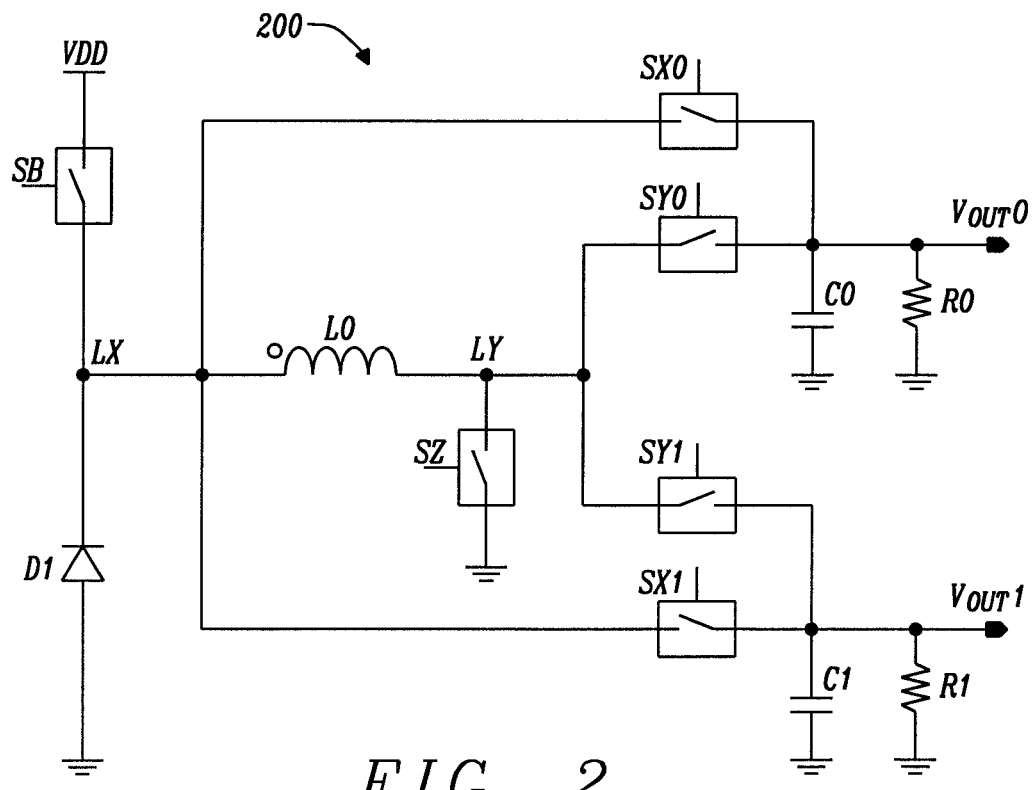
FIG. 2 shows a general embodiment of a single-inductor dual-output (SIDO) Buck switching converter, of the present disclosure.

FIG. 2 shows 200, a general embodiment of a single-inductor dual-output (SIDO) Buck switching converter, of the present disclosure. Switch SB is the Buck switch, connected between the supply voltage VDD and the LX node. The Buck diode D1, also implemented as a switch, allows current in a single direction, and has its anode at ground and cathode at the LX node. Inductor LO is between the LX and LY nodes.

SIDO Buck switches SY0 and SY1, between the LY node and outputs VOUT0 and VOUT1, respectively, allow current flow to or from the outputs. Additional switches SX0, SX1 and SZ enable the supply of complementary current to VOUT0 and VOUT1, with positive and negative polarity, respectively. Switch SX0 is connected between the LX node and VOUT0, switch SX1 between the LX node and VOUT1, and switch SZ between the LY node and ground. Output capacitor C0 and resistor R0 are between VOUT0 and ground, and output capacitor C1 and resistor R1 are between VOUT1 and ground.

As a part of physical implementation, additional switches SX0, SX1 and SZ can be designed to be smaller in size compared to the other switches, especially the pass devices. A design trade-off is silicon area vs. efficiency in negative operation. For typical SIDO operation, switches SX0, SX1 and SZ will be off. For the case where VOUT0 is supplying a positive load current in normal operation, and VOUT1 is requested to perform negative current operation, the switches will enable two different operation solutions as described in the following sections.

Figure 3A:
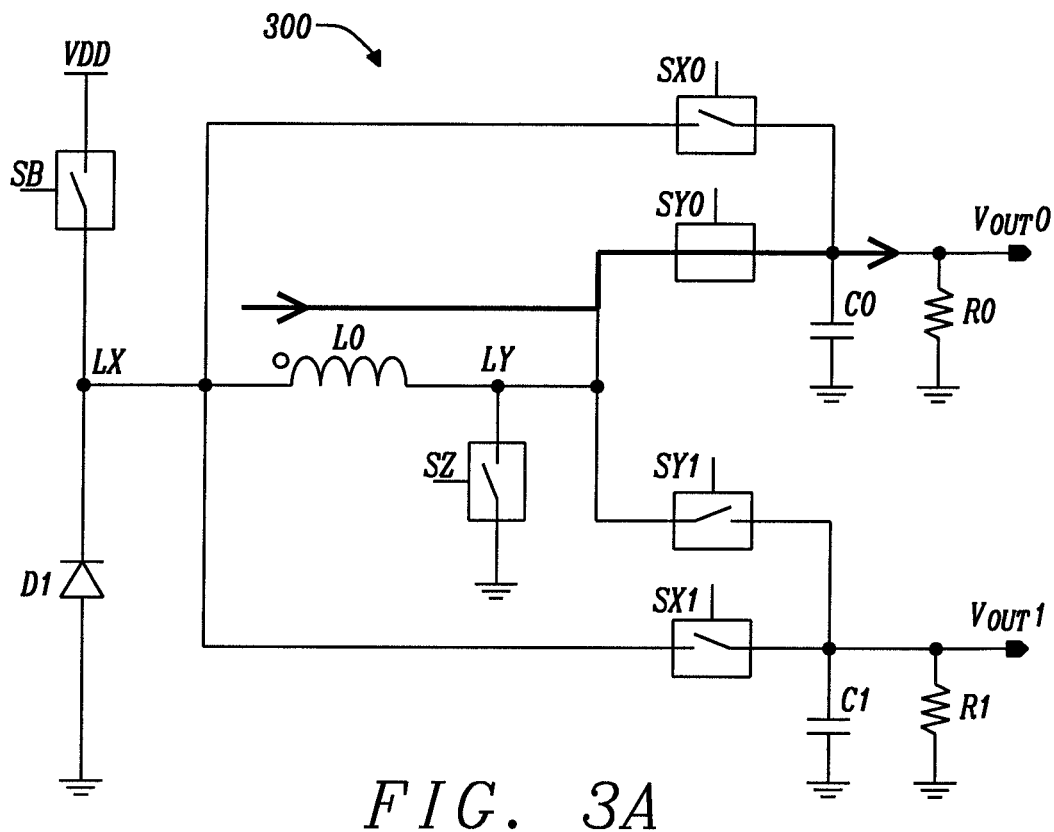
FIGS. 3A and 3B show positive operation to output VOUT0, and negative operation to output VOUT1, respectively, in discontinuous-conduction mode (DCM).
Figure 3B:
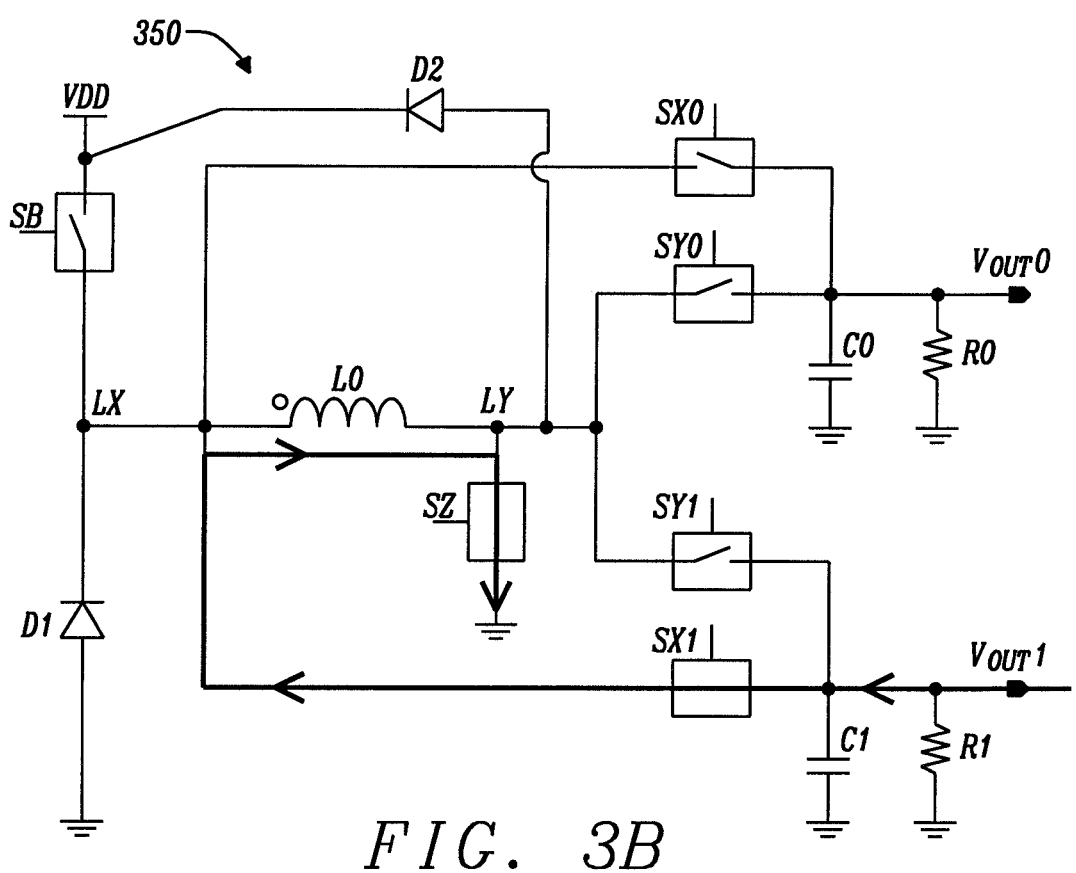

For negative SIDO operation (Option 1), FIGS. 3A and 3B show positive operation to output VOUT0, and negative operation to output VOUT1, respectively, in discontinuous-conduction mode (DCM). For a first bipolar solution, FIG. 3A 300 shows Phase A, and a positive current being supplied to VOUT0, in normal switching converter operation. Switch SY0 is on, switch SY1 is off, and switch SB is performing buck switching operation. Switches SX0, SX1 and SZ are off.

FIG. 3B 350 shows Phase B, negative current being supplied to VOUT1, in negative operation. Switches SY0 and SY1 are off, and switch SB is off, as well. Switch SX0 is off, and switches SX1 and SZ are on. An optional recycling diode D2 can be connected between the supply voltage VDD and the LY node.

Figure 4A:
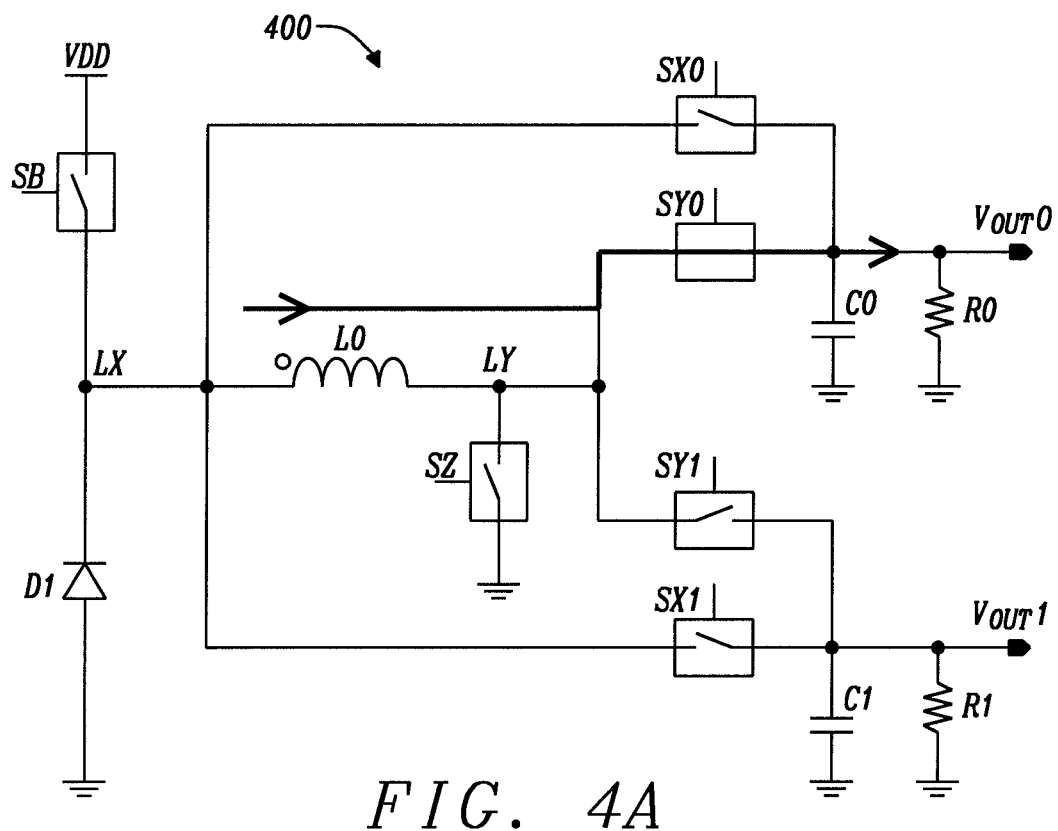
FIGS. 4A and 4B show positive operation to output VOUT0, and negative operation to output VOUT1, respectively, in continuous-conduction mode (CCM).
Figure 4B:
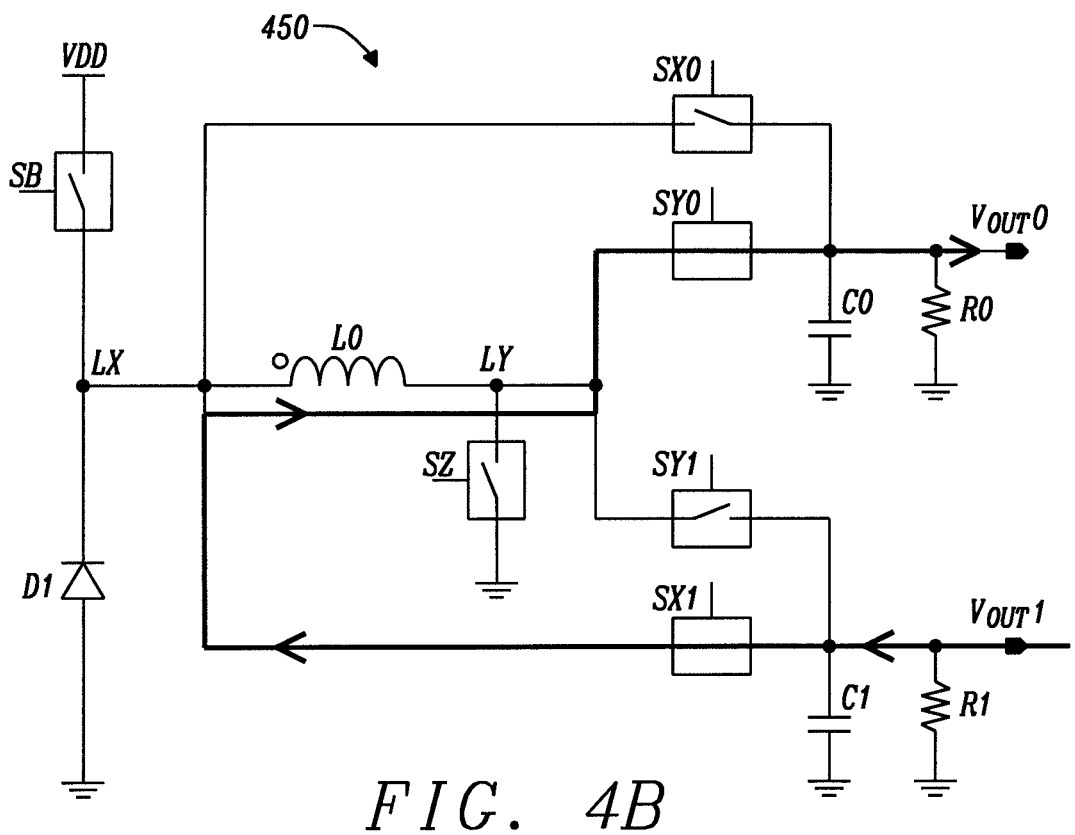

For negative SIDO operation (Option 2), FIGS. 4A and 4B show positive operation to output VOUT0, and negative operation to output VOUT1, respectively, in continuous-conduction mode (CCM). For a second bipolar solution, FIG. 4A 400 shows Phase A, similar to FIG. 3A, and a positive current being supplied to VOUT0, in normal switching converter operation. Switch SY0 is on, switch SY1 is off, and switch SB is performing buck switching operation. Switches SX0, SX1 and SZ are off.

FIG. 4B 450 shows Phase B, negative current being supplied to VOUT1, while at the same time providing a positive output current to VOUT0. Switches SX1 and SY0 are on, and switches SX0, SY1, SB and SZ are off.

The advantage of the negative operation of FIG. 4B is that the excess voltage of VOUT1 is used to supply load current to VOUT0—not using any supply current, and recycling stored energy in the load capacitors. This increases power efficiency in this negative operation mode, and improves output voltage ripple, because both outputs are being supplied at the same time. In prior art SIDO operation, only one output is supplied for a given phase.

Option 2 might not be preferred when VOUT0 is in sleep mode, e.g. there is no load current at VOUT0, because while VOUT0 increases, it could result in a VOVER condition. This mode also might not be preferred when VOUT0 is higher than VOUT1, and the coil current is not high, e.g. in DCM, because in this condition coil current will decay to zero, and this mode will not be advantageous. For these two conditions, Option 1 illustrated in FIGS. 3A and 3B is preferred over Option 2.

The embodiments of the disclosure shown in FIGS. 3A/3B and 4A/4B are for a positive output current at VOUT0 and negative output current at VOUT1. If instead there is a negative current at VOUT0 and positive current at VOUT1, current flow and the switches used would be the mirror image of that shown in FIGS. 3A-4B. That is, current would flow through SY1 (rather than SY0 as shown in FIG. 3A), through SX0 (rather than SX1 as shown in FIG. 3B), through SY1 (rather than SY0 as shown in FIG. 4A), and through SX0 (rather than SX1 as shown in FIG. 4B).

Figure 5:
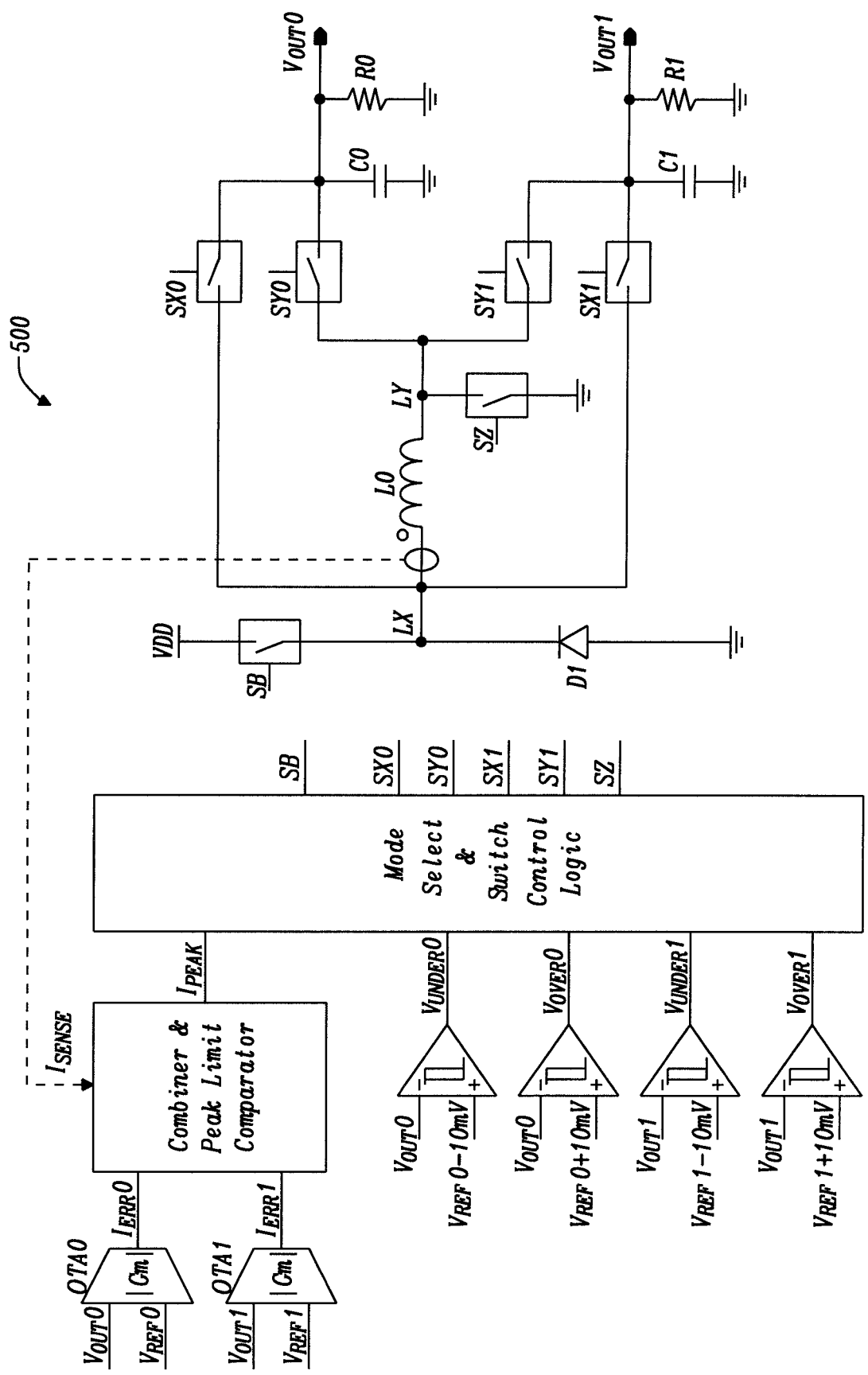
FIG. 5 illustrates a circuit diagram showing a mode select and switch control logic, for a preferred embodiment of the switching topology of the disclosure.

FIG. 5 illustrates 500, a circuit diagram showing a mode select and switch control logic, for a preferred embodiment of the switching topology of the disclosure. OTA0 and OTA1 cells generate output error currents $I_{ERR}0$ and $I_{ERR}1$, based on input voltages VOUT0 and VREF0, and VOUT1 and VREF1, respectively. The currents $I_{ERR}0$ and $I_{ERR}1$ are input to the combiner and peak limit comparator logic, along with $I_{SENSE}$ from the LX node. Using current mode control, output current peak limit $I_{PEAK}$ is input together with other compensation factors, for example comparator outputs VUNDER0 and VOVER0, and VUNDER1 and VOVER1, to the mode select and switch control logic, to determine the switch values SB, SX0, SX1, SY0, SY1, and SZ. The $V_{UNDER}$ and $V_{OVER}$ comparators make the negative operation mode decision, based on input voltages VOUT0, VREF0−10 mv and VOUT1, VREF1−10 mv, and VOUT0, VREF0+10 mv and VOUT1, VREF1+10 mv.

OTA0 and OTA1 cells provide the absolute value of error current on output error currents $I_{ERR}0$ and $I_{ERR}1$, where the error current will always be positive, even if there is an undershoot or an overshoot. If absolute value were not used, an overshoot on one output would be cancelled by an undershoot on the other output, resulting in no response in the system.

In the following simulation results, switches SX0, SX1, SY0 and SY1 change logic positions synchronous with the clock. This is not a requirement of the embodiment, but only done for purposes of the simulation itself.

Figure 6:
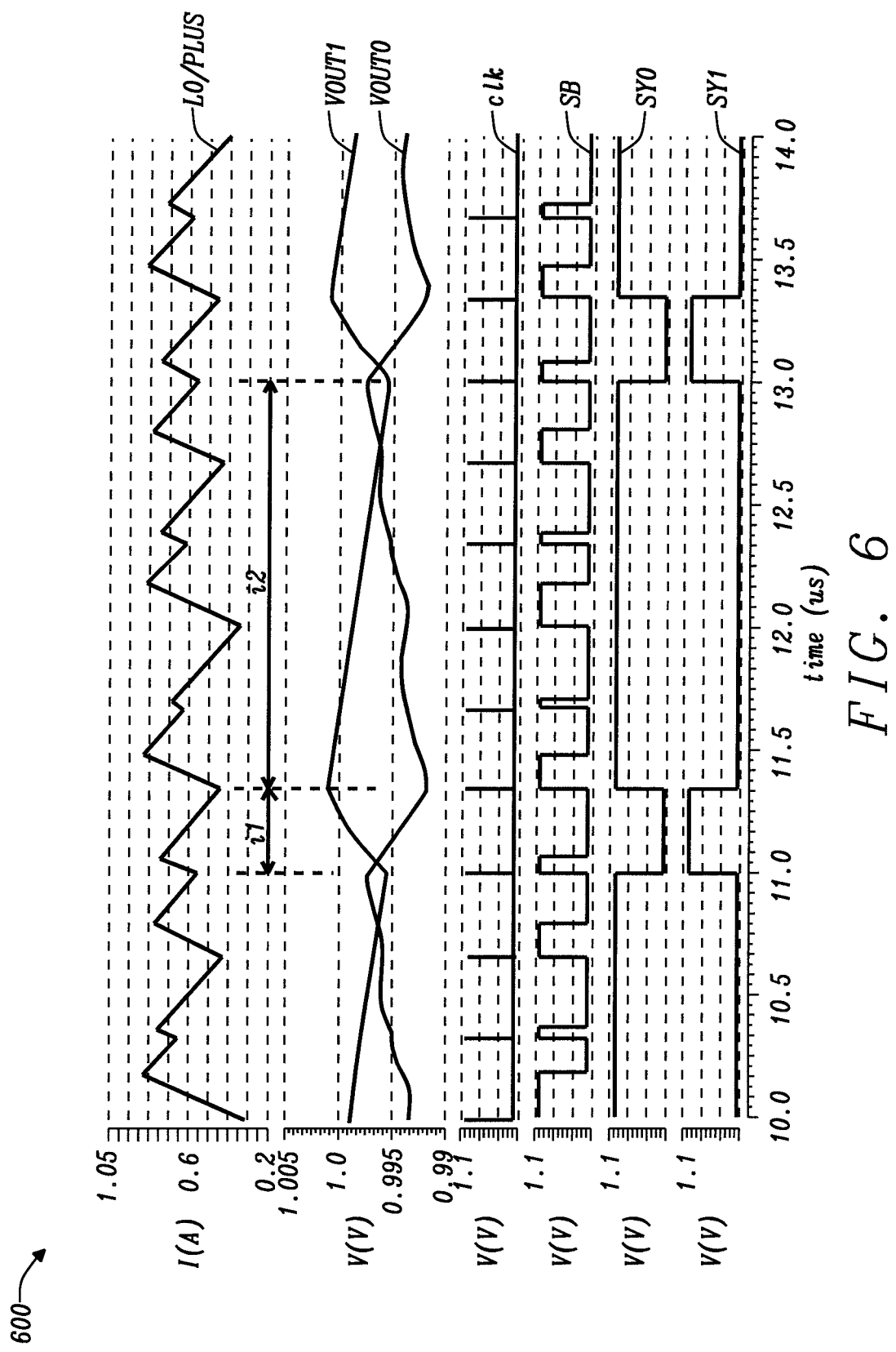
FIG. 6 includes current/voltage diagrams showing prior art SIDO operation, where both outputs VOUT0 and VOUT1 have a positive load current.

FIG. 6 includes current/voltage diagrams 600, showing prior art SIDO operation, where both outputs VOUT0 and VOUT1 have a positive load current. Simulation conditions are as follows: VDD=3.8V, VOUT0=1V, VOUT1=1V, L=1 uH, $C_{OUT0}$=30 uF, $C_{OUT1}$=30 uF, fsw=3 MHz, $I_{LOAD0}$=500 mA, $I_{LOAD1}$=100 mA. When both output loads are positive, normal operation will be performed. At simulation time 11 us, VOUT1 is lower, thus with the next clock switch SY1 turns on, and the coil current supplies VOUT1, during interval i1. During interval i2, switch SY0 is on, and the coil current supplies VOUT0 until 13 us, when the above cycle repeats.

Figure 7:
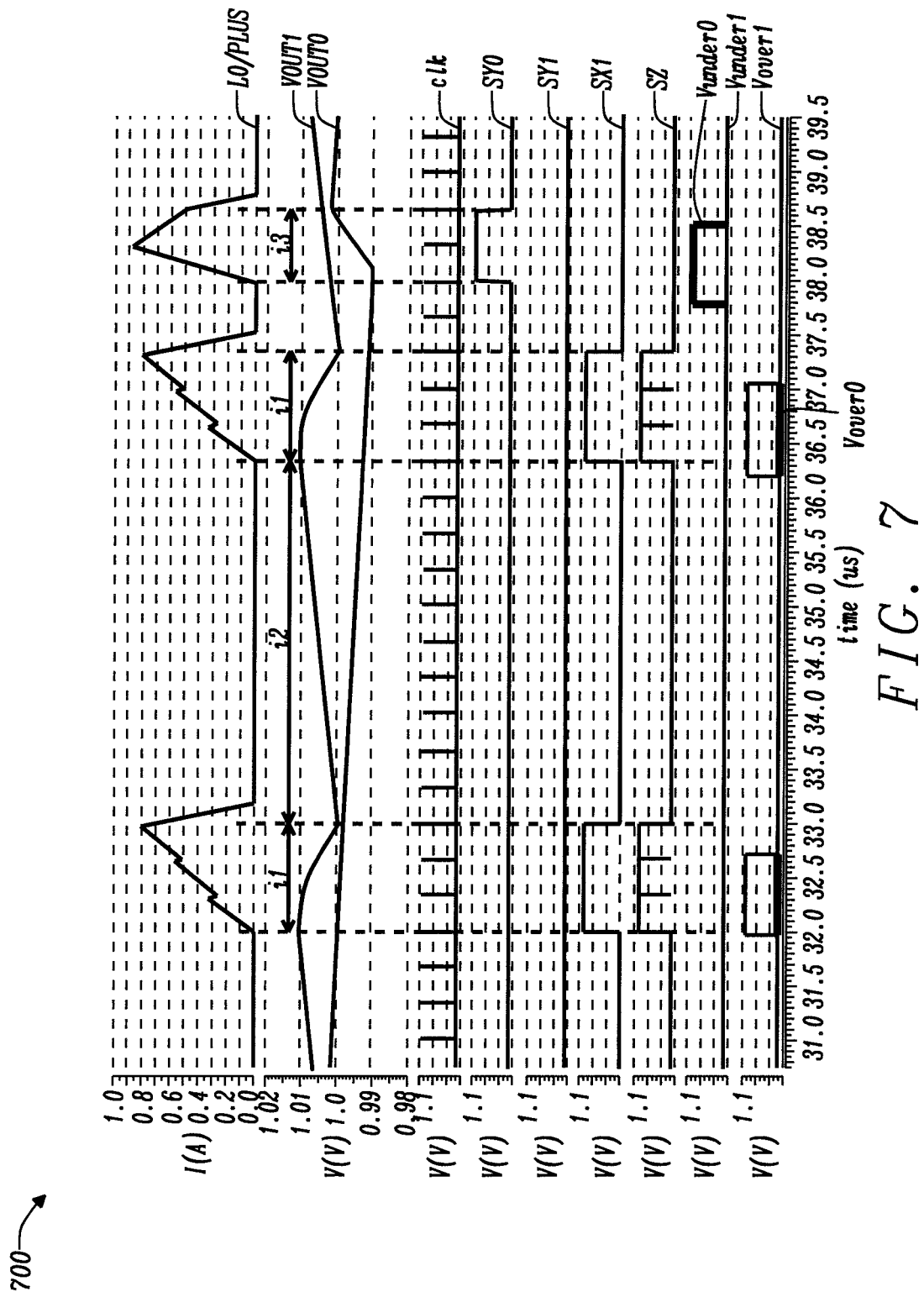
FIG. 7 includes current/voltage diagrams showing negative SIDO operation Option 1, in discontinuous-conduction mode (DCM) for the disclosure.

FIG. 7 includes current/voltage diagrams 700, showing negative SIDO operation Option 1, in discontinuous-conduction mode (DCM), for the disclosure. This example is for FIGS. 3A and 3B, where there is positive operation to output VOUT0, and negative operation to output VOUT1, respectively. Simulation conditions are as follows: $I_{LOAD0}$=50 mA (low load current, DCM operation expected), $I_{LOAD1}$=100 mA. At simulation time 32 us, VOVER1 goes high, requesting negative operation for VOUT1. During interval i1, switches SX1 and SZ are on, discharging VOUT1 as defined in FIG. 3B. During interval i2, there are no VOVER/VUNDER signals, thus the system is not switching, staying in sleep mode. The build-up inductor current can be discharged by the optional recycling diode D2. At simulation time 38 us, VUNDER0 goes high, switch SY0 turns on, and positive load current is supplied to VOUT0, during interval i3.

Figure 8:
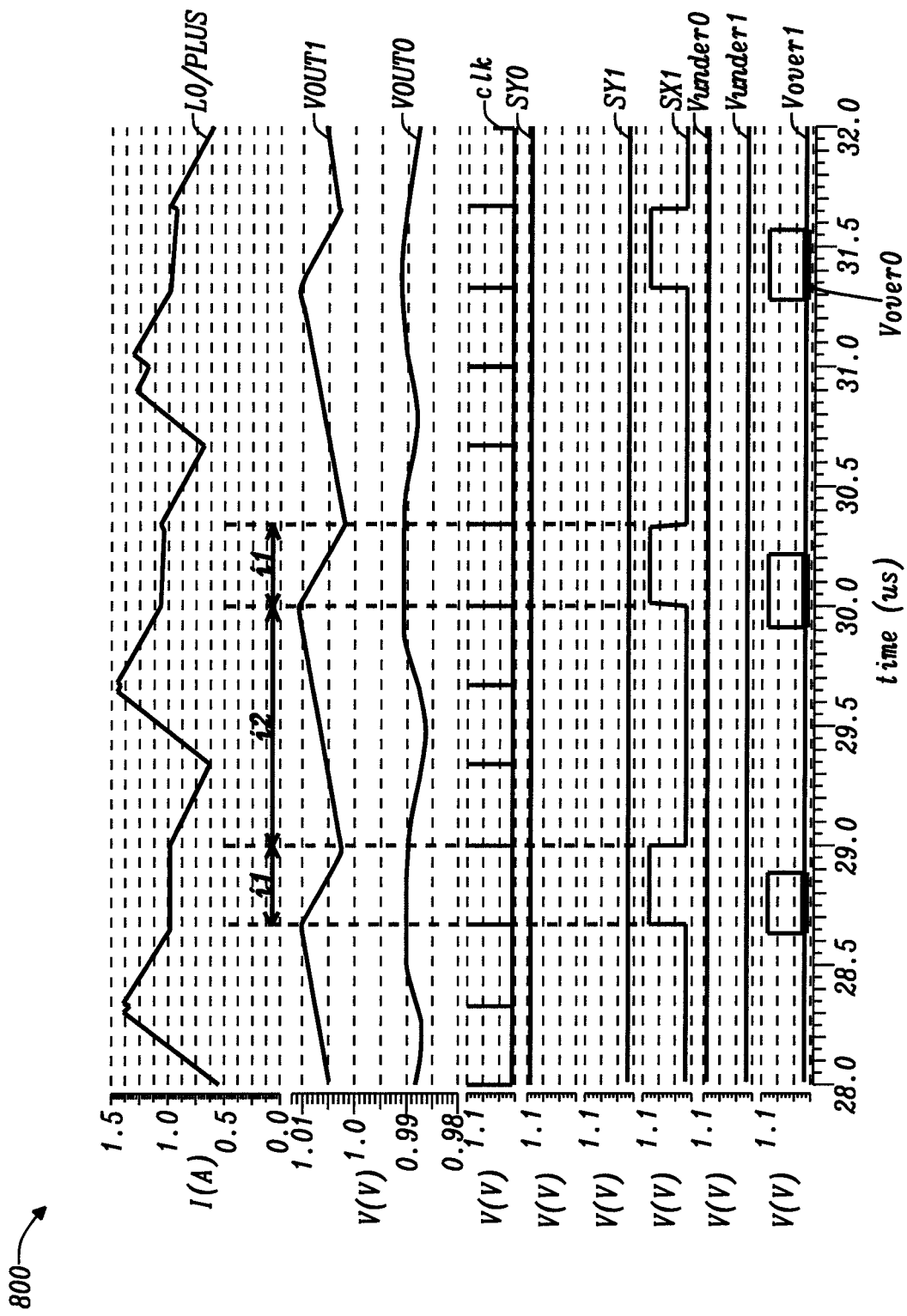
FIG. 8 includes current/voltage diagrams showing negative SIDO operation Option 2, in continuous-conduction mode (CCM), for the disclosure.

FIG. 8 includes current/voltage diagrams showing negative SIDO operation Option 2, in continuous-conduction mode (CCM), for the disclosure. This example is for FIGS. 4A and 4B, where there is positive operation to output VOUT0, and negative operation to output VOUT1, respectively. Simulation conditions are as follows: $I_{LOAD0}$=1 A (higher load current, CCM operation expected), $I_{LOAD1}$=−250 mA. Throughout the simulation, VUNDER0 is on, as VOUT0 is loaded with 1 A. During interval i1, VOVER1 is high, requesting negative operation for VOUT1. Switch SX1 turns on, and switch SY0 continues to stay on. Thus VOUT1 is discharged with the coil current, at the same time supplying load current to VOUT0, as defined in FIG. 4B. During interval i2, VUNDER0 is high, and load current is supplied to VOUT0. Switch SY0 stays on, and the Buck switching of SB continues.

Even though the present invention describes a new topology through the example of a SIDO Buck switching converter, the described concepts are applicable to other switching converter types. The Idea of adding more switches to a SIMO Buck switching converter can be also expanded to other topologies like a SIMO Boost switching converter, a SIMO Buck/Boost switching converter, and an inverting SIMO Buck/Boost switching converter. The SZ switch from the LY node to ground is already, advantageously, available in a SIMO Buck-Boost switching converter.

In summary, essential features of the disclosure include the Buck switch SB and diode D1, the SIDO Buck switches SY0 and SY1, and the switches SX0, SX1 and SZ enabling supplying complementary current to the outputs of FIG. 2. The features also include the negative SIDO switching operation as defined in FIG. 3B and FIG. 4B, as well as the OTA cells generating absolute value of the error current, and the control logic using VUNDER and VOVER signals as defined in FIG. 5, with operation shown in FIGS. 7 and 8.

FIG. 9 is flow chart 900, of a method for a single-inductor dual- or multiple-output (SIDO/SIMO) switching converter with negative current. The steps include 910, in a discontinuous-conduction mode (DCM), providing a positive current at a first output in a first DCM phase, and discharging a negative current at a second output through a discharge switch provided at an inductor output node in a second DCM phase. The steps also include 920, in a continuous-conduction mode (CCM), providing a positive current at the first output in a first CCM phase, and in a second CCM phase connecting a negative current from the second output to the first output.

The main advantage of one or more embodiments of the present disclosure include when one output has an overshoot and the other output is below a reference, the system enables discharging the overshoot output to the other output, resulting in a significant charge recycling and considerable increase in power efficiency. Another advantage is improved output voltage ripple, during when one output has an overshoot and the other output is below a reference, as both outputs are being supplied at the same time, as compared to prior art SIDO operation where only one output is supplied for a given phase.

While particular embodiments of the present disclosure have been illustrated and described, it will be understood by those skilled in the art that various changes in form and details may be made without departing from the spirit and scope of the invention.

The invention claimed is:

1. A single-inductor dual- or multiple-output (SIDO/SIMO) switching converter with negative current, comprising:
    an inductor input node;
    an inductor, connected between the inductor input node and an inductor output node;
    a first output switch connected between the inductor input node and a first output, wherein the first output is configured to provide a first current or voltage,
    and a second output switch connected between the inductor input node and a second output, wherein the second output is configured to provide a second current or voltage,
    wherein
    said first and second output switches are configured to supply complementary current to said first and second outputs during one switching cycle, and wherein said first and second outputs are configured to provide for a positive output current at said first output and a negative output current at said second output in a first configuration, and are configured to provide for a negative output current at said first output and a positive output current at said second output in a second configuration; and
    a discharge switch connected between said inductor output node and a lower voltage reference.

2. The SIDO/SIMO switching converter of claim 1, configured to operate in discontinuous-conduction mode (DCM) in which, during a first phase, the first current or voltage is provided at said first output.

3. The SIDO/SIMO switching converter of claim 2, in which, during a second phase, the second output switch is closed, the second current flows through said second output and through said inductor, and through said discharge switch.

4. The SIDO/SIMO switching converter of claim 1, configured to operate in continuous-conduction mode (CCM) in which, during a first phase, the first current or voltage is provided at said first output.

5. The SIDO/SIMO switching converter of claim 4, in which, during a second phase, the second output switch is closed, the second current flows through said second output and through said inductor, and to said first output.

6. The SIDO/SIMO switching converter of claim 1, further comprising a recycling diode connected between said inductor output node and a supply voltage.

7. The SIDO/SIMO switching converter of claim 1, wherein the switching converter is a SIMO Boost switching converter, a SIMO Buck/Boost switching converter, or an inverting SIMO Buck/Boost switching converter.

8. The SIDO/SIMO switching converter of claim 1, further comprising a first and second operational transconductance amplifier configured to generate a first and second output error current.

9. The SIDO/SIMO switching converter of claim 8, wherein the first and second output error currents are an absolute value and always positive.

10. The SIDO/SIMO switching converter of claim 8, further comprising combiner and peak limit comparator logic, having inputs comprising the first and second output error currents, and a current sense signal from the inductor output node.

11. The SIDO/SIMO switching converter of claim 10, further comprising mode select and switch control logic, having inputs comprising an output of the combiner and peak limit comparator logic, and under and over voltage comparator outputs.

12. The SIDO/SIMO switching converter of claim 10, wherein the first output, second output, and discharge switch values are configured by the mode select and switch control logic.

13. A method for operating a single-inductor dual- or multiple-output (SIDO/SIMO) switching converter with negative current, comprising the steps of:
  in a discontinuous-conduction mode (DCM), providing a first current or voltage at a first output in a first DCM phase, and discharging a second current or voltage at a second output during one switching cycle, through a discharge switch provided at an inductor output node in a second DCM phase;
  in a continuous-conduction mode (CCM), providing a first current or voltage at the first output in a first CCM phase, and in a second CCM phase connecting a second current or voltage from the second output to the first output; and
  supplying complementary current to said first and second outputs during one switching cycle, by configuring a first output switch and a second output switch;
  wherein said first and second output switches are configured to provide for a positive output current at said first output and a negative output current at said second output in a first configuration, and are configured to provide for a negative output current at said first output and a positive output current at said second output in a second configuration.

14. The method of claim 13, further comprising the steps of:
  providing an inductor, connected between an inductor input node at an output of said switching converter, and the inductor output node;
  connecting said first output switch between the inductor input node and the first output, wherein the first output is configured to provide the first current or voltage;
  connecting said second output switch between the inductor input node and the second output, wherein the second output is configured to provide the second current or voltage; and
  connecting a discharge switch between said inductor output node and a lower voltage reference.

15. The method of claim 14, further comprising connecting a recycling diode between said inductor output node and a supply voltage.

* * * * *